United States Patent [19]

Arens

[11] 4,132,989

[45] Jan. 2, 1979

[54] AZIMUTH CORRELATOR FOR REAL-TIME SYNTHETIC APERTURE RADAR IMAGE PROCESSING

[76] Inventors: Robert A. Frosch, Administrator of the National Aeronautics and Space Administration, with respect to an invention of Wayne E. Arens, Pasadena, Calif.

[21] Appl. No.: 843,308

[22] Filed: Oct. 18, 1977

[51] Int. Cl.² .............................................. G01S 7/30
[52] U.S. Cl. ........................ 343/5 CM; 343/100 CL
[58] Field of Search ...................... 343/5 CM, 100 CL

[56] References Cited

U.S. PATENT DOCUMENTS

| | | | |
|---|---|---|---|
| 4,045,795 | 8/1977 | Fletcher et al. | 343/5 CM |
| 4,084,158 | 4/1978 | Slawsby | 343/5 CM |

*Primary Examiner*—Maynard R. Wilbur
*Assistant Examiner*—Richard E. Berger
*Attorney, Agent, or Firm*—Monte F. Mott; John R. Manning; Paul F. McCaul

[57] ABSTRACT

An azimuth correlator architecture is defined wherein a number of serial range-line buffer memories are cascaded such that the output stages of all buffer memories together form a complete and unique range bin in the azimuthal dimension at any given time. A range bin is automatically read out of the last stages of the registers in parallel on a range line sample-by-sample basis for subsequent range migration correction and correlation. Range migration correction is performed on the range bins by effectively varying the length of a delay register at the output of each range-line buffer memory. The corrected range bin output from the delay registers is then correlated with a Doppler reference function to form an image element on a real-time basis.

11 Claims, 4 Drawing Figures

AZIMUTH CORRELATOR FOR REAL-TIME SYNTHETIC APERTURE RADAR IMAGE PROCESSING

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a real-time data processor, and more particularly to a real-time azimuth correlator for a synthetic aperture radar (SAR) image processor.

Radar imaging using side-looking synthetic aperture radar techniques is the best known approach for achieving high-resolution imagery through planetary atmospheric cloud cover. However, if the radar echo data are not processed into images onboard the spacecraft or aircraft, very large quantities of raw uncorrelated data must be sent to Earth for processing. Conversely, if images are produced onboard in real time, multiple-look data may be superimposed into single frames and conventional data-compression algorithms may be applied to significantly reduce the data volume and rates transmitted to Earth.

During recent years, considerable effort has been devoted to the development of a digital radar image-processing capability. Unfortunately, results to date indicate that the digital data processing required to produce correlated radar images onboard a spacecraft or small aircraft is prohibitive based upon cost, complexity, power, size and weight considerations. Since only limited data reduction, by means of presumming and time expansion, can be accomplished with the uncorrelated radar echo data, proposed radar mission requirements to date have implied the need for reliable high-speed and high-capacity tape recorders for storage and have imposed potentially severe requirements upon the telecommunications link and ground data-handling capabilities.

Recent development of charge-coupled device (CCD) technology offers the potential for considerable simplification of the complicated digital implementation of SAR convolution. For instance, a CCD transversal filter of length N provides N stages of storage while performing N signal-by-weighting coefficient multiplications each clock period. Since the powerful computational equivalency of a CCD transversal filter significantly alleviates the normal constraints associated with digital processing, a CCD SAR image processor offers a potentially attractive solution to the real-time onboard SAR signal-processing problem, as described by the inventor in a U.S. Pat. No. 4,045,795 titled "Charge-Coupled Device Data Processor for an Airborne Imaging System."

It is well recognized that azimuthal resolution in radar imaging is proportional to the size of the antenna. The physical size of a real aperture antenna normally becomes too large to achieve an azimuth resolution comparable to the range resolution available from typical radar band-widths. The process wherein a small antenna is used to simulate a large antenna in order to achieve a practical azimuth resolution is termed synthetic aperture. Synthetic aperture radar (SAR) is based upon the fact that there is no difference between a large aperture antenna and a small antenna that successively occupies all of the positions which are simultaneously occupied by the larger antenna, provided the data are successively collected, stored, and subsequently combined to simulate the larger antenna.

The problem in SAR data processing is thus collecting and correlating the echo-return pulses in N range bins, where N is a function of the desired range resolution. A resulting set of N range-line samples for a given azimuth position is called a range line. For each subsequent transmitted pulse, a new range line is generated. Since the radar physically moves in the time interval between transmitted pulses, each range line will be at a different azimuthal position. A number of range lines corresponding to the number of echo returns required to synthetically simulate the desired real aperture antenna must be stored. The resulting matrix consists of rows that contain different time delays or ranges, and columns that provide azimuthal information for a given range. The information required to produce a single image from the matrix is dispersed throughout the matrix. In the time domain, correlation must be accomplished in both the range and azimuth dimensions in order to convert the dispersed echo data into image elements.

The primary processing functions employed to convert echoes into image elements are sampling, presumming, range correlation and azimuth correlation. The echo returns are sampled at greater than Nyquist rate and stored. The stored samples are then read out at a lower rate over the full pulse repetition interval (PRI), thus resulting in a time expansion of N samples in the PRI, i.e. a data-rate reduction proportional to the echo pulse duty cycle.

For SAR applications, the PRF is such that the azimuth resolution frequently exceeds the range resolution. On the assumption that the azimuth resolution does not have to be greater than that in range, echo pulses may be presummed (range bin 1 added to range bin 1, range bin 2 added to range bin 2, etc., over successive echo pulses). If the azimuth resolution were 6.25 meters, then presumming every four pulses into one composite pulse would provide a resolution of 25 meters. The result would be a data-rate reduction of 4. It should be noted that the presumming function is not practically accomplished by direct summation, but must be achieved by means of filtering to adequately reduce aliasing effects.

Range correlation of an incoming echo signal from a given target with a replica of the transmitted signal results in a compressed pulse having a pulse width corresponding to the range resolution and a position in range corresponding to that of the actual target. The correlated signal pulse width is inversely proportional to the transmitted signal bandwidth. Large bandwidths yielding high resolution can be accommodated because pulse compression (correlation) techniques allow the signal bandwidth to be expanded with negligible sensitivity loss.

The primary problem of real-time SAR data processing is with azimuth correlation. Signals from a given target will be received during transit of the SAR through the desired real aperture. Due to the Doppler effect, the carrier return from the target will be frequency modulated due to the SAR motion through the desired real aperture. This FM is treated as a chirp function and is assumed to be a part of the input signal to the azimuth filter corresponding to the range bin in which the designated target lies. Correlation of this signal with the expected Doppler chirp function across all azimuthal target positions relative to the SAR in the desired real aperture yields a compressed pulse having a pulse width corresponding to the azimuth resolution and a position in azimuth corresponding to that of the actual target. More correlation points (i.e., a longer correlation time) simulates a larger real aperture and therefore provides a narrower pulse width and improved azimuth resolution.

Throughout the image-processing algorithm, it is desirable to measure both amplitude and phase. This is best accomplished by I and Q processing wherein the vector of each echo return is resolved into real (I) and quadrature (Q) components such that the sum $I^2 + Q^2$ is proportional to the power of the echo return. In order to combine successive echo returns, as required for azimuthal processing, they must be resolved into their real (I) and quadrature (Q) components. It is the azimuth correlation process required for the I and Q signals that gives use to the problem solved by the present invention. In most spacecraft and some aircraft applications, azimuth correlation of both the I and Q signals with the Doppler reference function, requires that both a linear and quadratic range migration compensation capability be provided. Furthermore, a capability for reprogramming and updating both the range migration correction and Doppler reference functions in real-time must be provided to compensate for variations in vehicle flight parameters.

SUMMARY OF THE INVENTION

In accordance with the present invention, incoming samples are transferred through cascaded range line memory means, each capable of storing one range-line of serial complex samples. Enough range lines are thus stored to correspond to the number of points required to correlate over the real aperture in the azimuth dimension. The last stage of each range-line memory means is separated from the last stage of the preceding and subsequent range-line memory means by exactly one range line. The outputs of the last stages, taken together, therefore form a complete and unique range bin in the azimuthal dimension at any given time. For each complex sample from a range line that is shifted into memory, every sample moves one stage through the entire cascaded memory array. The net result is that an entirely new set of samples occurs at the output stages of the range-line memory elements corresponding to a new azimuthal range bin. The desired azimuthal range bins to be corrected and subsequently correlated are automatically read out of the memory in parallel on a range-line sample-by-sample basis. Range migration compensation is performed on the range bins by reading the output of the last stage of each range-line memory means into an X-stage register where X is the maximum number of bins over which migration occurs. In effect, the X-stage registers as a group are storing parallel azimuthal range bins. To accomplish compensation, it is then only necessary to be able to select the information from any location within each register to form a new range bin for correlation corresponding to the desired correction curve through suitable taps and in response to programmable selection codes. The range migration compensated output from each X-stage delay register is then applied to a corresponding complex multiplier where it is properly weighted to conform to the appropriate Doppler reference function. The multipliers, as a group, receive Doppler reference function coefficients, from a microprocessor controller, that may be reprogrammed and updated in real time. Finally, the outputs from each complex multiplier are summed resulting in a correlated image element.

DESCRIPTION OF PREFERRED EMBODIMENTS

Figure 1:
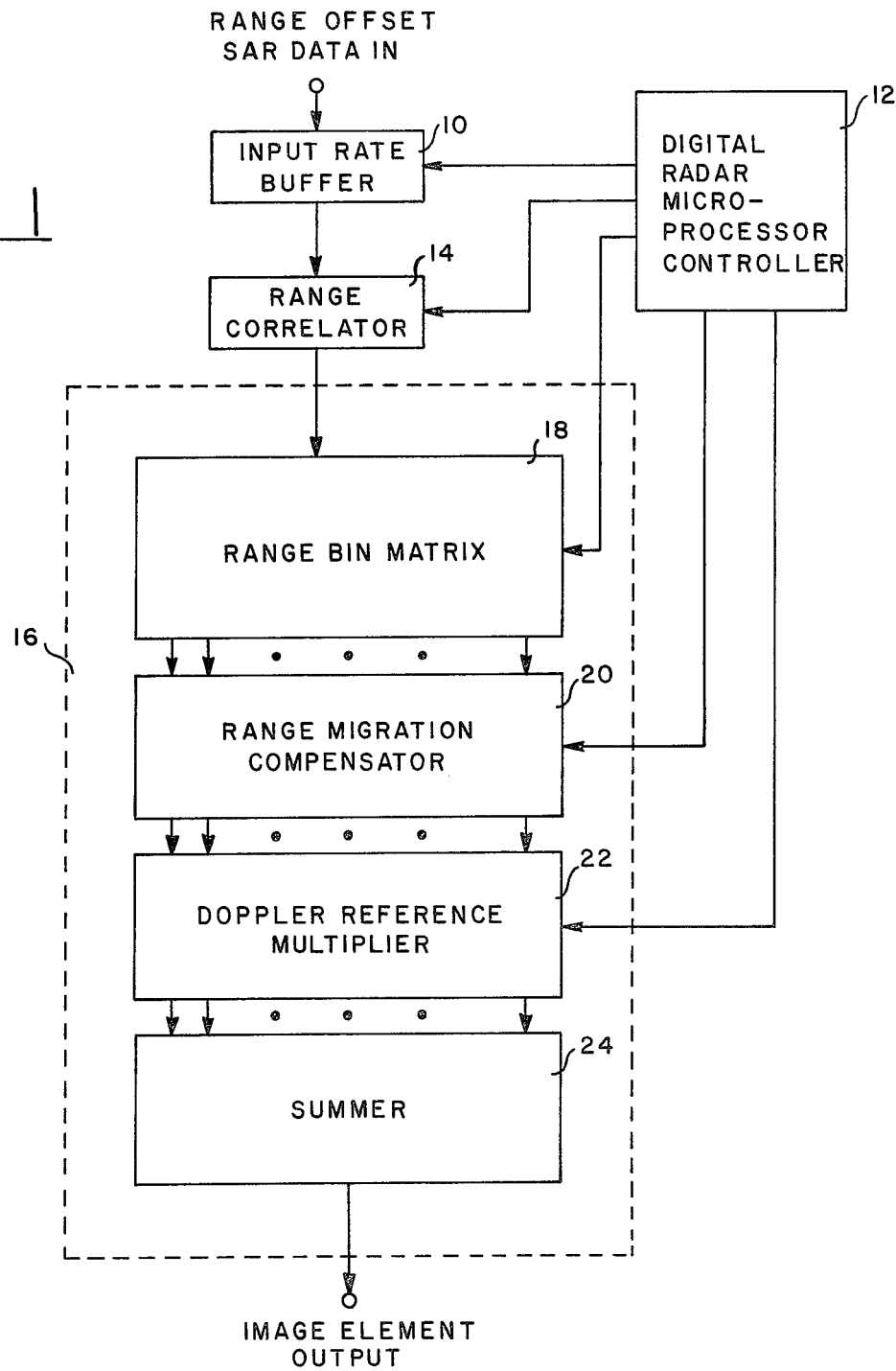
FIG. 1 is a general block diagram illustrating the architecture of a time domain synthetic aperture radar in accordance with the present invention.
Figure 2:
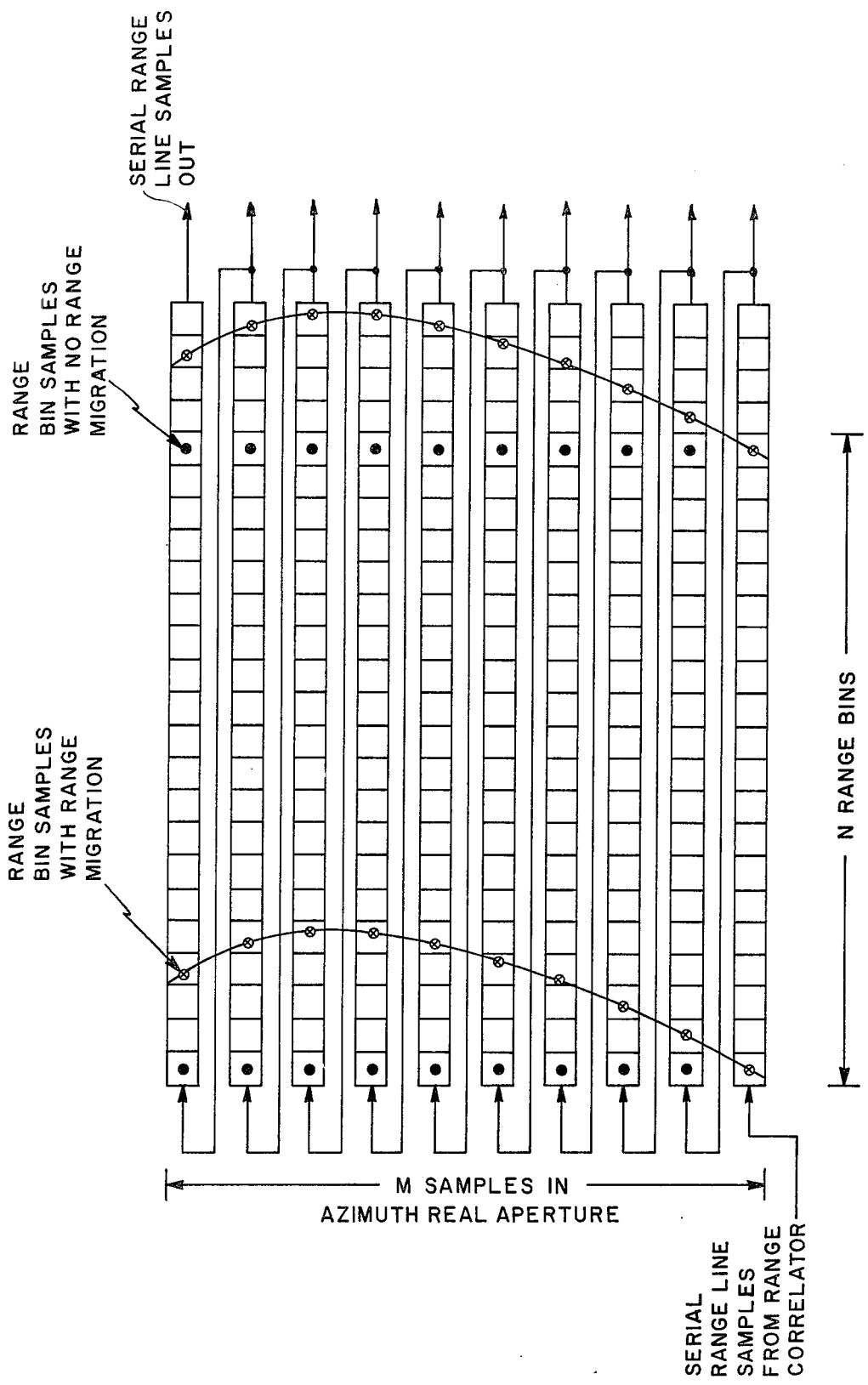
FIG. 2 is a schematic diagram illustrating a range-bin matrix in the azimuth correlator of FIG. 1.

A block diagram of a SAR image processing system incorporating the present invention is shown in FIG. 1. An input rate buffer 10 for SAR data provides the necessary radar echo return samples under control of a microprocessor controller 12. The microprocessor controller also controls the transfer of SAR data to a range correlator 14. The function of the range correlator is to provide correlation of an incoming echo signal from a given target with a replica of the transmitted signal. This correlation is carried out on echo return samples in real time on a range-line by range-line basis, each range line consisting of successive samples 1, 2, 3 ... N. Correspondingly numbered range-line samples from M successive range lines form successive range bins 1, 2 ... N as shown in FIG. 2. Each range bin is then correlated in an azimuth correlator 16 in real time in accordance with the present invention to provide an image element output for each range-line sample received. Although reference will be made hereinafter to range-line samples, it is to be understood that the samples are complex samples consisting of both I and Q components.

A resulting set of N range-line samples for a given echo return is called a range line. For each subsequent transmitted pulse, a new range line is generated. Since the radar physically moves in the time interval between transmitted pulses, each range line will be at a different position in the direction of motion of the aircraft or spacecraft carrying the radar. A number of range lines corresponding to the number M of PRF echo returns required to synthetically simulate the desired real aperture antenna must therefore be stored.

A range bin matrix 18 receives the serial range line samples from the range correlator, and stores the samples in the form shown in FIG. 2. A number of range lines are stored to correspond to the number of points required to correlate over the real aperture of the SAR in the azimuth dimension. For example, assume the number M of range lines is 1000. Furthermore, assume that integration of 1000 samples yields 6.25m resolution in azimuth. If the number of samples M were reduced to 250, the resolution would only be 25m. The resolution desired in azimuth thus dictates the number M of the matrix.

Before storing a number of range lines in a matrix of M×N range-line samples, range correlation is carried out by the real-time range correlator 14. The range-correlation function is carried out by convolving the incoming echo signal from a given target with a replica of the transmitted signal, and the result is a compressed pulse having a pulse width corresponding to that of the actual target. This real-time range-correlation function may be carried out by a CCD transversal filter as described in the aforesaid U.S. Pat. No. 4,045,795. Assuming the reference function is stable, a fixed tap-weighted transversal filter could be used. A typical implementation would include four transversal filters on a single CCD integrated circuit chip to accomodate complex convolution.

The number N of samples to be stored is determined by the range desired in the imagery. A typical number might be 1000 range bins. A matrix of M×N samples must thus be coherently integrated in azimuth to form a single image line comprised of N azimuth correlated range bins. However, before integration, the range bins read out for integration must first be corrected for range migration by a range migration compensator 20. In addition, each sample of each range bin must be multiplied by a proper Doppler reference function using a multiplier 22 prior to integration by a summer 24.

As just noted, for each new range line of N range-line samples shifted into memory, correlation must be performed over M samples in each of N range bins to produce a new image line. Unfortunately, corresponding range-line samples do not stay in the same range bin throughout the entire time a given target remains in the radar beam. Instead, they migrate over several range bins, as shown in FIG. 2 for the beginning and end of each group of serial range line samples. Without range migration, those samples would be in line, as represented by dots in the memory range bins, but with range migration, the same samples would be distributed over range bins as shown by circled X's. Consequently, in order to perform correlation for each of N range bins, it is necessary to select only those samples that lie on the migration curve indicated which has both a linear and a quadrature component. In order to do that, more range-line samples must be stored than the number N required for the desired range. Typically, 1100 samples may be stored for $N = 1000$ to allow for a maximum range migration over 100 range bins.

The range migration effect is due to geometric considerations of the SAR flight path, the rotation of the surface of the planet, and the curvature of the surface of the planet. Range migration may be best visualized as a migration of a target in range over a number of PRI's as the target moves through the real aperture. Range migration compensation is accomplished through the compensator 20 for each range bin in the azimuth dimension to be correlated with the appropriate Doppler reference. A programmed weighting function corresponding to the Doppler reference is provided for each range bin sample through the multiplier 22. Both the compensator 20 and multiplier 22 are under control of the microprocessor controller 12 which receives the necessary data to compute the range migration compensation and Doppler weighting. The range migration compensated and Doppler weighted range-bin signals in the azimuth direction are then integrated in the summer 24 to provide the desired azimuth output signal on a real-time basis. Each set of integrated range-bin signals produces a picture element (pixel) for a given range.

The azimuth-correlation function carried out by the azimuth correlator 16 utilizes a unique architecture which makes possible real-time SAR image processing onboard a spacecraft or aircraft. As just noted, the first step in achieving this azimuth correlation in real time is to read correlated range lines into the range-bin matrix 18 shown schematically in FIG. 2. Range-bin data from the range correlator enters a bottom row of range-bin memory cells at the left and propagates through the row, left to right, and into the next row, again entering on the left, and so forth. The serial range-bin data exits from the last cell on the right of the last row. Enough range lines are stored to correlate over the real aperture in the azimuth dimension for the resolution desired.

As further noted with reference to FIG. 2, the last stage of each range-line memory is separated from the last stage of the preceding and subsequent range-line memory by exactly the number of range-line samples in one range line. The outputs of the last stages, taken together, therefore form a complete and unique range bin over the real aperture in the azimuthal dimension at any given time. For each unique range-line sample from a range line that is shifted into memory, every range-line sample moves one stage through cascaded buffer memories. The net result is that an entirely new set of samples occurs at the output stages of the buffer memories corresponding to a new azimuthal range bin. The minimum number of range-bin samples required to process an image element are thus automatically and successively read out of the memory in parallel for each range-line sample read in to the memory. The readout rate is synchronized with the range-line sample rate resulting in the most efficient transfer of data possible.

Echo-return signals from a given target will be received during a number of successive PRI's as the SAR passes through the desired real aperture. The size of the real aperture desired thus determines the length of range-line memories (rows of cascaded memory stages) required. Azimuth correlation could be carried out by simply weighting and summing the outputs of the range-line memories except for the range migration effect that needs to be compensated.

An output overlay buffer (not shown) may be used to superimpose single-look images from the output of the summer 24 to form multi-look image frames which may be either recorded onto film, used to generate computer compatible tapes, or the like. How the images are used is not a part of this invention which relates only to the real-time image processing of the input signals to the SAR, and more particularly to the azimuth processing.

Figure 3:
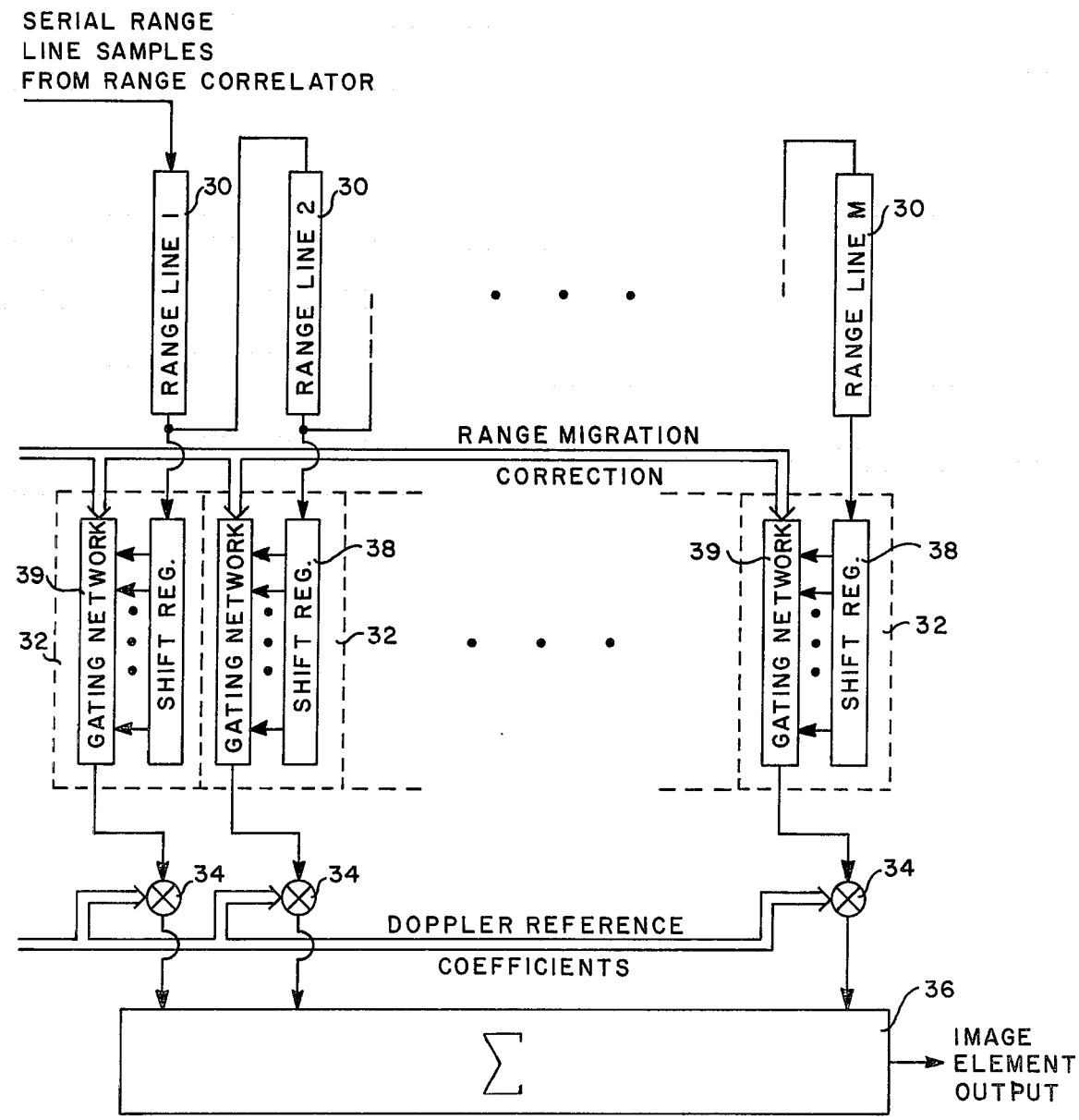
FIG. 3 is a block diagram of a first exemplary embodiment of the azimuth correlator in FIG. 1.

Referring now to FIG. 3, an exemplary embodiment for the azimuth correlator 16 is comprised of range-line buffer memories (shift registers) 30 connected in cascade to realize the range-bin matrix 18. The range-bin matrix thus implemented provides for the first step of real-time azimuth correlation which is accomplished by reading correlated range lines into the memory so organized. The second step is for the range bins aligned in azimuth to be read from the memory in parallel into variable delay lines 32 which receive range migration correction control signals. The output range bins of the variable delay lines are range migration compensated.

The range migration compensated signals are applied to multipliers 34 and summing network 36 wherein they are convolved with a Doppler reference function. Due to the Doppler effect, the carrier return from the target is frequency modulated as a target passes through the SAR aperture, first with an increasing frequency to a point where the target is directly broadside, and then with a decreasing frequency. This frequency modulation in the form of a chirp function, is treated in essentially the same way as the reference function in the transversal filter of the range correlator. Thus, for each range bin read from the range-bin matrix, there is produced an azimuth correlated image element.

The manner in which the variable delay lines 32, comprised of shift registers 38 and gating networks 39, are used to effect range migration compensation will now be described. Since the outputs of the last stages of the range line memories form a complete and unique range bin in the azimuthal dimension at any given time, and since every sample moves one stage through the entire cascaded memory array for each unique sample from the range correlator shifted into memory, the result is that an entirely new set of range-bin samples occurs at the output of the range line memories for every range-line sample interval. If there were no range migration, these azimuthal range bins could be correlated directly. But with range migration, a particular target may appear in successive range lines in different range bins, as indicated by the solid line curve of FIG. 2 which represents the range position of a given target in the successive range lines. Therefore to effect range migration compensation, the shift registers 38 are tapped at successive range-line sample intervals, and the particular taps used across the array of delays are selected by range migration compensation control from the microprocessor controller 12.

If the variable delays are implemented as CCD serial shift registers, as disclosed in the aforesaid patent, the uncompensated azimuthally aligned range-bin signals move one stage through the shift registers during every range-line sample interval. Thus the output of the last stage of each range-line memory 30 is read into a shift register 38 having a number of stages corresponding to the maximum number of bins over which migration can occur. In effect, the shift registers taken as a group store uncompensated azimuthally aligned range bins. To accomplish compensation, it is only necessary to select the appropriate range-bin signals from any location within each register to form a new array of compensated azimuthally aligned range-bin signals for correlation corresponding to the range migration curve. The net effect is the same as being able to slide every range line in the range-bin matrix (range line memories) in either direction through range bins until the desired samples are aligned for correlation. This may be implemented by selectively enabling output gates 39 which couple stages of the variable delays (shift registers) into the multipliers 34. There the Doppler weighting is applied by the reference function coefficients used for azimuth correlation. The Doppler reference coefficients are computed and provided by the microprocessor controller. In that manner range migration compensated azimuthal range bins are automatically correlated to produce a new image element during every range line sample interval in real time.

Figure 4:
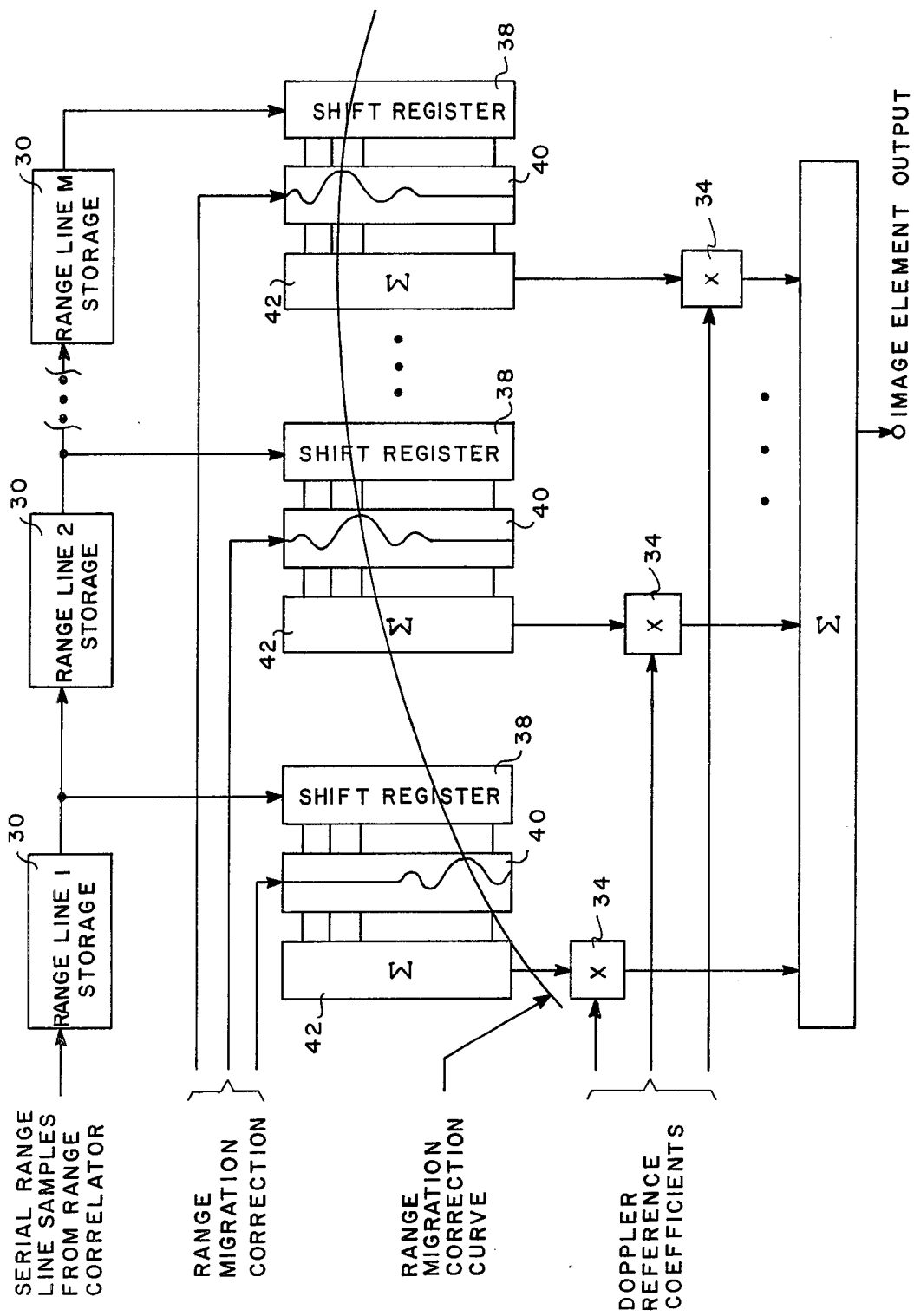
FIG. 4 is a block diagram of a second exemplary embodiment.

To effectively interpolate more precise compensation, the range migration curve may be accommodated by effectively resampling the range-bin signals at the correct phase (time location of the range line within a range bin). A system for this resampling technique is shown in FIG. 4. Components common to the system of FIG. 3 are identified by the same reference numerals. If the range correlator output in the form of range line samples (which is exactly what is in each shift register 38) is convolved with a digitally sampled (sin x/x) function, the original range correlated signal will be reproduced, and by shifting the phase of the (sin x/x) function, the original range correlated signal is sampled at points different in range by the amount of phase shift. Thus the same range correlated signal can be produced following convolution, only it will be sampled at different points corresponding to the phase shift of the (sin x/x) function. As schematically illustrated in FIG. 4, a range migration compensated sample within a range bin may be accomplished to fit the range migration compensation curve precisely. The microprocessor controller positions the (sin x/x) function for each shift register 38 location to accomodate the range migration curve by computing (sin x/x) function values for each output tap (stage) of every shift register and applying the computed (sin x/x) function values to a bank 40 of multipliers. The outputs of the multipliers are summed in networks 42 and then applied to multipliers 34. This entire function could be achieved with a single CCD transversal filter wherein the (sin x/x) function is the reference. The outputs of each multiplier 34 are then summed to form an image element for each new range line sample from the range correlator.

Although particular embodiments of the invention have been described and illustrated herein, it is recognized that modifications and variations may readily occur to those skilled in the art. It is therefore intended that the claims be interpreted to cover such modifications and variations.

What is claimed is:

1. In a synthetic aperture radar system, an azimuth correlator for real time image processing of range correlated range line samples from echo return signals, the combination comprising:
   a plurality of serial range-line buffer memories cascaded so that the output stage of one feeds into the input stage of another, and the output stages of all buffer memories together form a complete and unique range bin, whereby a range bin is automatically read out on a range line sample-by-sample basis,
   a plurality of variable delay means, one for each range-line buffer memory, for receiving successive range bins and in each controllably delaying individual range bin samples a selected number of range line sample periods to effect range migration correction across a range bin,
   multiplying means, connected to receive the selectively delayed outputs from said variable delay means, for correlating a Doppler reference function with each successive range-migration corrected range bin to form an image element on a real time basis, and
   means for summing the Doppler reference correlated range bin samples.

2. The combination of claim 1 wherein each of said serial range-line buffer memories is comprised of a predetermined number of complex sample memory stages greater than the number, N, of range bins to be processed for the number N of image elements at successive ranges, the predetermined number of complex sample memory stages being greater than the number N by a number sufficient to accommodate the maximum range migration to be corrected.

3. The combination of claim 2 wherein said variable delay means is comprised of shift registers each having a number of complex sample memory stages necessary to accommodate the maximum range migration to be corrected, and gating means connected to the stages of each shift register for selectively coupling the output of any stage to said correlation means for range-migration correlation.

4. The combination of claim 3 wherein said Doppler reference function is a controlled variable.

5. The combination of claim 2 wherein said variable delay means is comprised of shift registers each having a number of complex sample stages necessary to accommodate the maximum range migration to be corrected and a separate means for collectively correlating the outputs of all stages of each shift register with a phase variable (sin x/x) function to selectively couple a resampled range bin sample output, which is interpolated to within a fraction of the range line sample period, to said means for Doppler reference function correlation.

6. The combination of claim 5 wherein said Doppler reference function is a controlled variable.

7. The combination of claim 1 wherein said Doppler reference function is a controlled variable.

8. In a synthetic aperture radar system, an azimuth correlator for real time image processing of range correlated range line samples from echo return signals, the combination comprising:

a plurality of serial range-line buffer memories cascaded so that the output stage of one feeds into the input stage of another, and the output stages of all buffer memories together form a complete and unique range bin, whereby a range bin is automatically read out on a range line sample-by-sample basis, correlation means connected by coupling means to receive outputs from said range-line buffer memories for correlating a controllably variable Doppler reference function with each successive range bin to form an image element on a real time basis, and means for summing the Doppler reference correlated range bin samples.

9. An azimuth correlator for real-time synthetic aperture radar image processing under control of a radar controller, comprising a plurality of cascaded range-line memory means, each having a plurality of stages for storing one range line of serial complex samples, whereby the outputs of all range line memory means together form a complete and unique range bin in the azimuthal dimension at any given time, and for each complex sample from a range line that is shifted into memory, every sample moves one stage through the plurality of range-line memory means, means connected to the output stages of said plurality of range-line memory means for performing range migration compensation under control of said radar controller, and means connected to said range migration compensation means for correlating range-migration corrected range bin samples with a Doppler reference function under control of said radar controller.

10. The combination of claim 9 wherein said range migration compensation means is comprised of a plurality of shift registers, each having the same number of stages, and means under control of said radar controller for gating range line samples from selected stages of said shift registers.

11. The combination of claim 10 wherein said range migration compensation means is comprised of a plurality of shift registers, each having the same number of stages, and means under control of said radar controller for correlating a selectively phase shifted (sin x/x) functions with the outputs of said shift register stages, thereby to provide range migration compensation.

* * * * *